United States Patent
Jiang et al.

(10) Patent No.: US 12,229,506 B2
(45) Date of Patent: Feb. 18, 2025

(54) METHOD AND SYSTEM FOR FILTERING ILL CORPUS

(71) Applicant: Zhejiang Gongshang University, Zhejiang (CN)

(72) Inventors: Xiaoning Jiang, Zhejiang (CN); Kai Liu, Zhejiang (CN); Yuhan Zhou, Zhejiang (CN); Hongmin Xie, Zhejiang (CN); Yukuan He, Zhejiang (CN); Weijie Liu, Zhejiang (CN); Jie Zhang, Zhejiang (CN); Zhen Liu, Zhejiang (CN)

(73) Assignee: Zhejiang Gongshang University, Hangzhou (CN)

(*) Notice: Subject to any disclaimer, the term of this patent is extended or adjusted under 35 U.S.C. 154(b) by 94 days.

(21) Appl. No.: 18/067,428

(22) Filed: Dec. 16, 2022

(65) Prior Publication Data
US 2024/0037328 A1 Feb. 1, 2024

(30) Foreign Application Priority Data

Jul. 29, 2022 (CN) .......................... 202210905334.8

(51) Int. Cl.
*G06F 40/232* (2020.01)
*G06F 40/295* (2020.01)
*H04L 51/212* (2022.01)

(52) U.S. Cl.
CPC .......... *G06F 40/232* (2020.01); *G06F 40/295* (2020.01); *H04L 51/212* (2022.05)

(58) Field of Classification Search
CPC .. G06F 40/232; G06F 16/3344; G06F 40/295; H04L 51/212
See application file for complete search history.

(56) References Cited

U.S. PATENT DOCUMENTS 7,119,794 B2 * 10/2006 Kong ................. G06F 3/0237
345/157
7,305,624 B1 * 12/2007 Siegel ................. G06F 16/954
715/733
(Continued)

FOREIGN PATENT DOCUMENTS

CN 111914550 A * 11/2020 ........... G06F 16/319
CN 113488165 A * 10/2021
(Continued)

*Primary Examiner* — Benjamin Smith
(74) *Attorney, Agent, or Firm* — Schwegman Lundberg & Woessner, P.A.

(57) ABSTRACT

A method and a system for filtering ill corpus are provided. The method includes following steps: acquiring a text corpus to be recognized, and preprocessing the text corpus to be recognized to obtain a basic text corpus; extracting entities in the basic text corpus, and performing matching search on the entities of the basic text corpus according to an ill-text knowledge graph to obtain a first recognition result; detecting and recognizing the basic text corpus according to a corpus recognition model to obtain a second recognition result; and filtering the text corpus to be recognized according to the first or/and the second recognition result, and updating the ill-text knowledge graph according to the second recognition result. With semantic network essence and strong correlation ability of knowledge graph technology, candidate ill entities can be obtained, thus facilitating filtering of obscure ill information in forms of pinyin, homophonic words and split words.

12 Claims, 2 Drawing Sheets

(56) References Cited

U.S. PATENT DOCUMENTS

| | | | | |
|---|---|---|---|---|
| 7,712,053 B2* | 5/2010 | Bradford | | G06F 16/338 |
| | | | | 715/773 |
| 7,725,550 B2* | 5/2010 | Choi | | H04L 67/565 |
| | | | | 709/217 |
| 8,434,126 B1* | 4/2013 | Schepis | | H04N 21/6582 |
| | | | | 726/16 |
| 8,676,909 B2* | 3/2014 | Guyot | | H04L 51/212 |
| | | | | 709/206 |
| 8,990,738 B2* | 3/2015 | Bradford | | G10L 13/08 |
| | | | | 715/811 |
| 9,614,807 B2* | 4/2017 | Spivack | | G06Q 10/10 |
| 9,876,751 B2* | 1/2018 | Spivack | | G06Q 50/01 |
| 10,031,977 B1* | 7/2018 | Maycock | | G06F 16/248 |
| 10,839,013 B1* | 11/2020 | Werris | | G06F 40/216 |
| 10,848,448 B2* | 11/2020 | El-Alfy | | H04L 51/212 |
| 11,837,221 B2* | 12/2023 | Aher | | G06F 16/435 |
| 2002/0196163 A1* | 12/2002 | Bradford | | G06F 3/0237 |
| | | | | 341/22 |
| 2004/0217944 A1* | 11/2004 | Kong | | G06F 40/232 |
| | | | | 345/173 |
| 2005/0248546 A1* | 11/2005 | Kong | | G06F 3/0237 |
| | | | | 345/173 |
| 2008/0263159 A1* | 10/2008 | Choi | | H04L 51/212 |
| | | | | 709/206 |
| 2012/0102130 A1* | 4/2012 | Guyot | | H04L 51/212 |
| | | | | 709/206 |
| 2012/0272160 A1* | 10/2012 | Spivack | | H04L 67/535 |
| | | | | 715/752 |
| 2012/0278164 A1* | 11/2012 | Spivack | | G06F 3/0482 |
| | | | | 705/14.66 |
| 2012/0296991 A1* | 11/2012 | Spivack | | G06F 16/951 |
| | | | | 709/206 |
| 2012/0310633 A1* | 12/2012 | Fujii | | G06F 16/335 |
| | | | | 704/9 |
| 2014/0013221 A1* | 1/2014 | Zheng | | G06F 40/166 |
| | | | | 715/264 |
| 2015/0161245 A1* | 6/2015 | Bradford | | G10L 13/08 |
| | | | | 707/722 |
| 2018/0025012 A1* | 1/2018 | Cao | | G06F 16/287 |
| | | | | 707/740 |
| 2018/0083903 A1* | 3/2018 | El-Alfy | | G06N 20/10 |
| 2018/0210960 A1* | 7/2018 | Maycock | | G06F 16/24578 |
| 2018/0349502 A1* | 12/2018 | Maycock | | G06F 16/9535 |
| 2020/0218988 A1* | 7/2020 | Boxwell | | G06N 5/02 |
| 2021/0117417 A1* | 4/2021 | Hendrickson | | G06F 16/90 |
| 2022/0084077 A1* | 3/2022 | Bian | | G06F 16/435 |
| 2022/0277738 A1* | 9/2022 | Aher | | G06N 20/00 |
| 2022/0377035 A1* | 11/2022 | Shapiro | | H04L 51/063 |
| 2023/0325396 A1* | 10/2023 | Hendrickson | | G06F 16/2425 |
| | | | | 707/776 |
| 2024/0062748 A1* | 2/2024 | Aher | | G06F 40/166 |

FOREIGN PATENT DOCUMENTS

| | | | | | |
|---|---|---|---|---|---|
| CN | 113963357 A | * | 1/2022 | | |
| CN | 113963357 B | * | 3/2022 | | |
| CN | 115422923 A | * | 12/2022 | | G06F 40/232 |
| CN | 115809336 A | * | 3/2023 | | |
| CN | 113486656 B | * | 11/2023 | | G06F 16/367 |
| CN | 117992616 A | * | 5/2024 | | |
| WO | WO-2021223882 A1 | * | 11/2021 | | |

\* cited by examiner

METHOD AND SYSTEM FOR FILTERING ILL CORPUS

CROSS-REFERENCE TO RELATED APPLICATION

This Non-provisional application claims priority under 35 U.S.C. § 119(a) to Chinese Patent Application No. 202210905334.8, filed on 29 Jul. 2022, the entire contents of which is hereby incorporated by reference in its entirety.

TECHNICAL FIELD

The disclosure relates to processing of text information, in particular to a method for filtering an ill corpus oriented to a network platform.

BACKGROUND ART

In recent years, with advent of the mobile Internet era and explosion of technologies such as 5G communication, various social platforms and e-commerce platforms have sprung up, and massive users can communicate and express their thoughts in real time in text forms such as barrage comments and message comments. However, due to virtual nature of the Internet, these network platforms are filled with a large number of ill text corpora on the Internet, and all kinds of ill information mainly involving advertisements, pornography, vulgarity, violence and reaction emerge in endlessly, which seriously damages communication environment of the Internet and gradually appears in more obscure ways, such as pinyin, homophonic words, split words and new words. Therefore, it is particularly important to restrain spread of ill information and filter all kinds of ill vulgar information to ensure a good Internet environment.

At present, methods for filtering ill information on the network platform are mainly based on keyword matching. Although this kind of method is simple, fast and easy to operate, its actual filtering effect is still not ideal, and it is prone to missed filtering. Moreover, it is difficult to cope with changeable and obscure Internet comment environment, and is impossible to filter more obscure ill information in time and effectively.

SUMMARY

In order to filter ill corpus information in a network platform, a method for filtering an ill corpus is provided in this disclosure.

A method for filtering an ill corpus includes following steps:
- acquiring a text corpus to be recognized, and preprocessing the text corpus to be recognized to obtain a basic text corpus;
- extracting entities in the basic text corpus, and performing matching search on the entities of the basic text corpus according to an ill-text knowledge graph to obtain a first recognition result;
- detecting and recognizing the basic text corpus according to a corpus recognition model to obtain a second recognition result; and
- filtering the text corpus to be recognized according to the first recognition result or/and the second recognition result, and updating the ill-text knowledge graph according to the second recognition result.

Further, construction of the ill-text knowledge graph includes:
- acquiring a large amount of original ill text information in the network platform, and extracting entities of the original ill text information to obtain a plurality of ill word entities;
- performing entity conversion processing on the ill word entities so as to obtain ill word pinyin entities and ill word homophonic entities; and
- extracting a relationship among the ill word entities, the ill word pinyin entities and the ill word homophonic entities according to pinyin conversion, homophonic conversion and part-of-speech and term frequency, and constructing triples by entity disambiguating so as to obtain the ill-text knowledge graph.

Further, obtaining the first recognition result specifically includes:
- screening the entities of the basic text corpus according to the ill-text knowledge graph so as to obtain a plurality of candidate ill entities by a preset number; and
- mapping the basic text corpus and the candidate ill entities into a multidimensional vector using a word2vec model, calculating similarity between the basic text corpus and the candidate ill entities according to a cosine-similarity calculation method, and obtaining the first recognition result according to the similarity.

Further, the corpus recognition model is a KNN model.

Further, construction of the corpus recognition model includes:
- acquiring ill information fed back by users and collecting normal corpus information;
- performing pinyin conversion and homophonic conversion on the ill information and the normal corpus information word by word to obtain pinyin corpus information and homophonic corpus information;
- dividing the ill information, the normal corpus information, the phonetic corpus information and the homophonic corpus information as a sample set into a training set and a test set, and mapping the sample set into a space vector through the word2vec model; and
- performing training on the training set mapped into the spatial vector using a KNN model so as to obtain the corpus recognition model.

Further, performing entity conversion processing on the ill word entities so as to obtain the ill word pinyin entities and the ill word homophonic entities includes:
- performing pinyin conversion on the ill word entities, and perform pinyin conversion on Chinese characters of the ill word entities word by word to obtain the ill word pinyin entities; and
- performing homophonic conversion on the ill word entities and performing homophonic conversion on the Chinese characters of the ill word entities word by word to obtain the ill word homophonic entities.

Further, the text corpus to be recognized includes barrage comments and message comments.

Further, the preprocessing includes participle processing, stop word processing and function word processing.

The disclosure has advantages as follows:

In the method for filtering ill information according to the disclosure, entity extraction is performed on a large number of initial ill text corpora, and pinyin and homophonic entity conversion are performed to construct the ill-text knowledge graph. In this disclosure, ill texts can be screened by knowledge graph technology, and with its semantic network essence and strong correlation ability, a plurality of candidate ill entities can be obtained and further determined by using cosine similarity, thus facilitating filtering of obscure ill information in forms of pinyin, homophonic words and split words. In addition, the disclosure also provides a second recognition mode, which constructs a machine learn model based on ill information fed back by users, thereby facilitating screening out of obscure ill information in a form of new words. Moreover, by updating the ill information in the form of new words into the ill-text knowledge graph in real time, it is facilitated to timely and effectively accurately filter a variety of obscure ill information, to reduce occurrence of missed filtering and purify communication environment of the Internet.

BRIEF DESCRIPTION OF THE DRAWINGS

In order to explain the embodiments of the present disclosure or the technical scheme in the prior art more clearly, the drawings required in the description of the embodiments or the prior art will be briefly introduced below; obviously, the drawings in the following description are only some embodiments of the present disclosure, and other drawings can be obtained according to these drawings by those of ordinary skill in the art without paying creative labor.

DETAILED DESCRIPTION

In order to make purposes, features and advantages of this disclosure more clear and understandable, technical schemes in embodiments of this disclosure will be described clearly and completely with reference to the drawings in the embodiments of this disclosure; and it is obvious that the embodiments described below are only part of the embodiments of this disclosure, but not all of them. On a basis of the embodiments in this disclosure, all other embodiments obtained by the ordinary skilled in the art without any creative effort are within the protection scope of this disclosure.

The disclosure will be further elucidated with reference to drawings and specific embodiments in the following.

Embodiment 1

Figure 1:
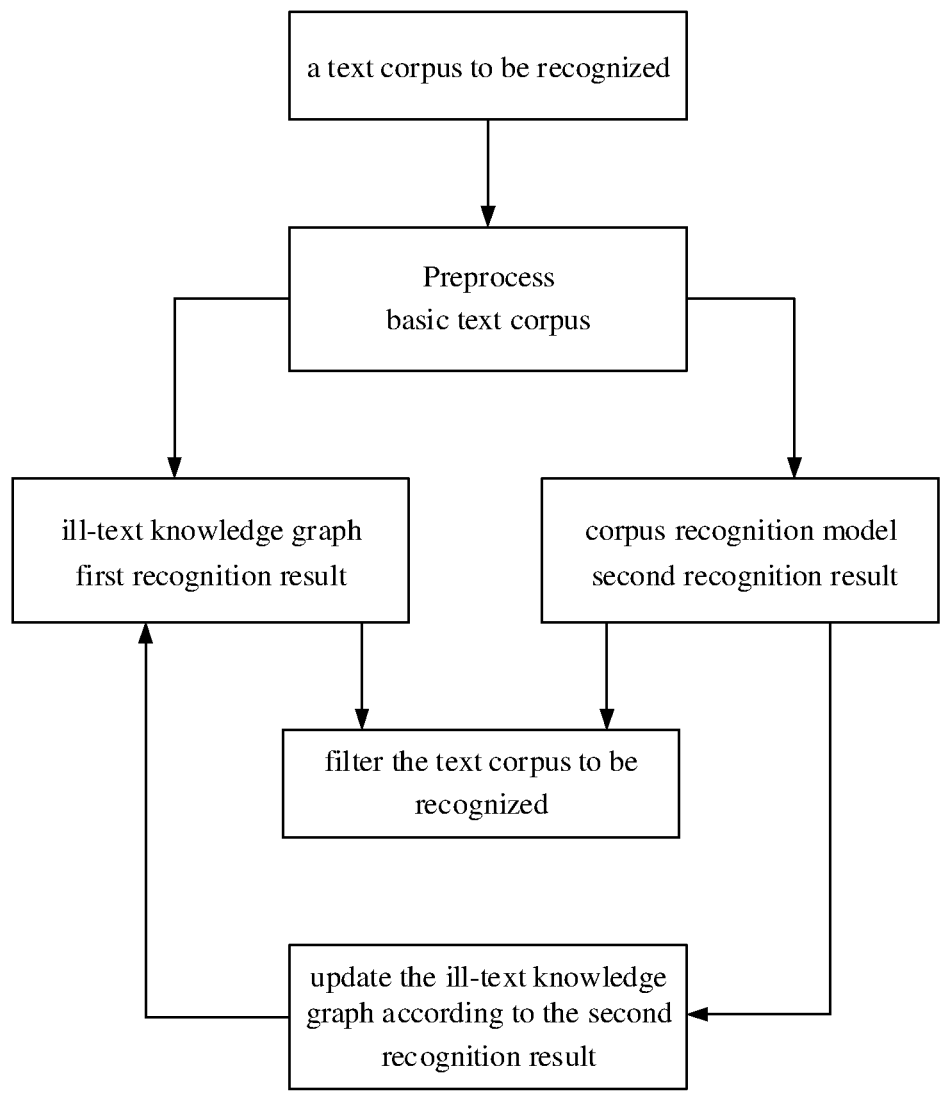
FIG. 1 is a flow chart of a method for filtering an ill corpus.

A method for filtering an ill corpus is provided in this embodiment, as shown in FIG. 1, which includes following steps S1 to S5.

In S1, a text corpus to be recognized is acquired, and the text corpus to be recognized is preprocessed to obtain a basic text corpus.

In S2, entities in the basic text corpus are extracted, and matching search is performed on the entities of the basic text corpus according to an ill-text knowledge graph to obtain a first recognition result.

In S3, the basic text corpus is detected and recognized according to a corpus recognition model to obtain a second recognition result.

There is no sequential relationship between steps S2 and S3. There may be no first recognition result, because the ill-text knowledge graph is constantly updated, and some of ill words may not be included in the ill-text knowledge graph at the beginning. If there is no first recognition result, step S3 is executed; and If there is a first recognition result, step S4 is executed.

In S4, the text corpus to be recognized is filtered according to the first recognition result or/and the second recognition result.

In S5, the ill-text knowledge graph is updated according to the second recognition result.

There is no sequential relationship between steps S4 and S5.

The text corpus to be recognized in S1 is obtained from the network platform, including barrage comments and message comments. Preprocessing the text corpus to be recognized includes processing of participle, stop words and function words in the text corpus to be recognized.

Construction of the ill-text knowledge graph in S2 includes the following steps:

A large number of original ill text information in the network platform are obtained based on data crawler technology, and these original ill text information are preprocessed one by one. Entities of original ill text information are extracted using an external dictionary method, so as to obtain several ill word entities. The ill word entities include words involving pornography, gambling, drugs, violence, superstition, religion and politics.

Entity conversion processing is performed on the ill word entities so as to obtain ill word pinyin entities and ill word homophonic entities. It specifically includes following steps: performing pinyin conversion on the ill word entities, and perform pinyin conversion on Chinese characters of the ill word entities word by word to obtain the ill word pinyin entities; and performing homophonic conversion on the ill word entities and performing homophonic conversion on the Chinese characters of the ill word entities word by word to obtain the ill word homophonic entities.

A relationship among the ill word entities, the ill word pinyin entities and the ill word homophonic entities is extracted according to pinyin conversion, homophonic conversion and part-of-speech and term frequency, and triples are constructed by entity disambiguating so as to obtain the ill-text knowledge graph, which is then stored in a Neo4j graph database.

A first recognition process includes following steps:
  extracting entities of the basic text corpus of the preprocessed text corpus to be recognized, screening the entities of the basic text corpus according to the ill-text knowledge graph so as to obtain a plurality of candidate ill entities by a preset number; and
  mapping the basic text corpus and the candidate ill entities into a multidimensional vector using a word2vec model, calculating similarity between the basic text corpus and the candidate ill entities according to a cosine-similarity calculation method, and obtaining the first recognition result according to the similarity.

The similarity is calculated as follows:

$$\cos\theta = \frac{\sum_i^n (A_i * B_i)}{\sqrt{\sum_i^n (A_i)^2} * \sqrt{\sum_i^n (B_i)^2}} = \frac{A*B}{|A|*|B|}$$

where COS θ is cosine similarity with an interval of [0,1]; A represents a vector feature of the basic text corpus; B represents a vector feature of the candidate ill entity; N represents a number of vector features.

The corpus recognition model in S3 is a KNN model, and its specific construction process includes the following steps.

Ill information fed back by users is acquired on multiple network platforms and normal corpus information is collected.

Pinyin conversion and homophonic conversion are performed on the ill information and the normal corpus information word by word to obtain pinyin corpus information and homophonic corpus information.

The ill information, the normal corpus information, the phonetic corpus information and the homophonic corpus information as a sample set are divided into a training set and a test set with a ratio of 7:3, and the sample set is mapped into a space vector through the word2vec model.

Training is performed on the training set mapped into the spatial vector using a KNN model so as to obtain the corpus recognition model. The trained corpus recognition model is evaluated. If the model evaluation result meets model generation conditions, the corpus recognition model is qualified and can be exported; otherwise, training is continued.

In this scheme, the second recognition result is configured as a supplement to the first recognition result, and the model can be constructed to filter out hidden ill information in a form of new words, and the ill information in the form of new words can be updated into the ill-text knowledge graph in real time, which facilitates timely and effective accurate filtering of various hidden ill information.

Embodiment 2

Figure 2:
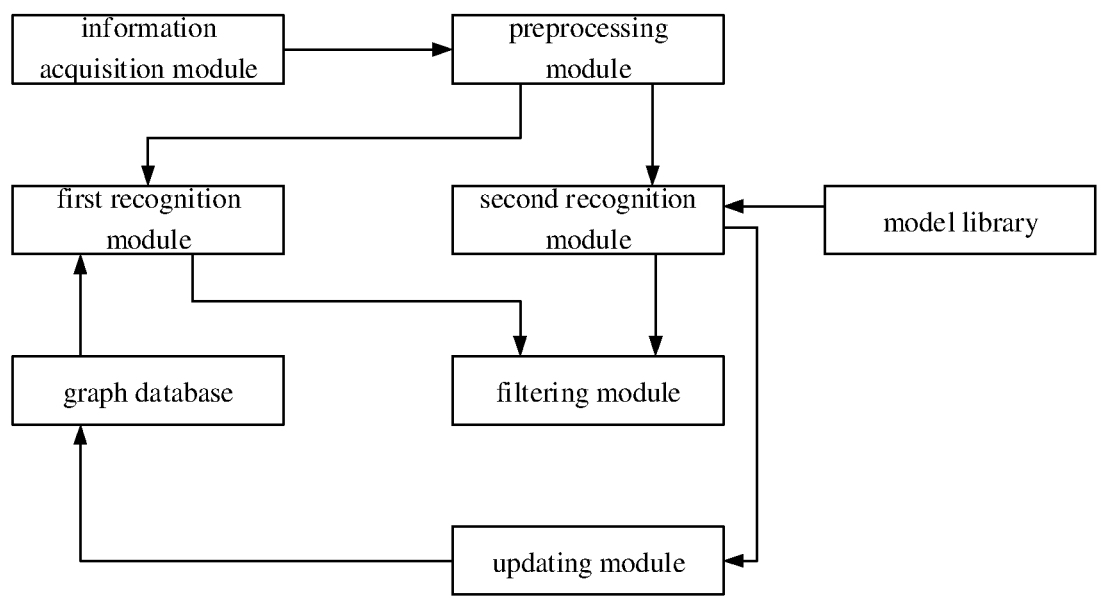
FIG. 2 is a schematic diagram of a system for filtering an ill corpus.

A system for filtering an ill corpus is provided in this embodiment, which is configured to implement the method for filtering the ill corpus in Embodiment 1. As shown in FIG. 2, it includes an information acquisition module, a graph database, a model library, a first recognition module, a second recognition module, a filtering module, an updating module.

The information acquisition module is configured to acquire the text corpus to be recognized. The text corpus to be recognized is imported into a preprocessing module, and the preprocessing module is configured to preprocess the text corpus to be recognized, including participle processing, stop word processing and function word processing, so as to obtain a basic text corpus. The basic text corpus is imported into the first recognition module and the second recognition module for detection and recognition.

The graph database is configured to store an ill-text knowledge graph, and the model library is configured to store the corpus recognition model.

The first recognition module is configured to call the ill-text knowledge graph stored in the graph database, to extract entities in the basic text corpus, and to perform matching search on the entities of the basic text corpus according to the ill-text knowledge graph to obtain a first recognition result. Specifically, a recognition process includes the following steps:

extracting entities of the basic text corpus of the preprocessed text corpus to be recognized, screening the entities of the basic text corpus according to the ill-text knowledge graph so as to obtain a plurality of candidate ill entities by a preset number; and mapping the basic text corpus and the candidate ill entities into a multidimensional vector using a word2vec model, calculating similarity between the basic text corpus and the candidate ill entities according to a cosine-similarity calculation method, and obtaining the first recognition result according to the similarity.

The similarity is calculated as follows:

$$\cos\theta = \frac{\sum_i^n (A_i * B_i)}{\sqrt{\sum_i^n (A_i)^2} * \sqrt{\sum_i^n (B_i)^2}} = \frac{A * B}{|A| * |B|}$$

where cos θ is cosine similarity with an interval of [0,1]; A represents a vector feature of the basic text corpus; B represents a vector feature of the candidate ill entity; N represents a number of vector features.

The second recognition module is configured to call the corpus recognition model stored in the model library, and to detect and recognize the basic text corpus according to the corpus recognition model to obtain a second recognition result.

The filtering module is configured to receive the first recognition result obtained by the first recognition module and the second recognition result obtained by the second recognition module, and to filter the text corpus to be recognized according to the first recognition result or the second recognition result.

The updating module is configured to update the ill-text knowledge graph according to the second recognition result.

The system also includes a construction module, which is configured to construct the ill-text knowledge graph and the corpus recognition model, and the constructed ill-text knowledge graph and the corpus recognition model are stored in the graph database and the model library respectively.

A process of constructing the ill-text knowledge graph is as follows.

A large number of original ill text information in the network platform are obtained based on data crawler technology, and these original ill text information are preprocessed one by one. Entities of original ill text information are extracted using an external dictionary method, so as to obtain several ill word entities. The ill word entities include words involving pornography, gambling, drugs, violence, superstition, religion and politics.

Entity conversion processing is performed on the ill word entities so as to obtain ill word pinyin entities and ill word homophonic entities. It specifically includes following steps: performing pinyin conversion on the ill word entities, and perform pinyin conversion on Chinese characters of the ill word entities word by word to obtain the ill word pinyin entities; and performing homophonic conversion on the ill word entities and performing homophonic conversion on the Chinese characters of the ill word entities word by word to obtain the ill word homophonic entities.

A relationship among the ill word entities, the ill word pinyin entities and the ill word homophonic entities is extracted according to pinyin conversion, homophonic conversion and part-of-speech and term frequency, and triples are constructed by entity disambiguating so as to obtain the ill-text knowledge graph, which is then stored in a Neo4j graph database.

A process of constructing the corpus recognition model is as follows.

Ill information fed back by users is acquired on multiple network platforms and normal corpus information is collected.

Pinyin conversion and homophonic conversion are performed on the ill information and the normal corpus information word by word to obtain pinyin corpus information and homophonic corpus information.

The ill information, the normal corpus information, the phonetic corpus information and the homophonic corpus information as a sample set are divided into a training set and a test set with a ratio of 7:3, and the sample set is mapped into a space vector through the word2vec model.

Training is performed on the training set mapped into the spatial vector using a KNN model so as to obtain the corpus recognition model. The trained corpus recognition model is evaluated. If the model evaluation result meets model generation conditions, the corpus recognition model is qualified and can be exported; otherwise, training is continued. The corpus recognition model is output to the model library for storage.

In several embodiments provided in this application, it should be understood that the disclosed apparatus and method can be implemented in other ways. For example, the device embodiment described above is only exemplary, for example, division of a module or unit is only a logical function division, and there may be another division mode in actual implementation, for example, a plurality of units or components may be combined or integrated into another device, or some of the features may be ignored or not executed.

The modules may or may not be physically separated, and a component displayed as a unit may be one physical unit or multiple physical modules, that is, they may be located in one position or distributed to multiple different positions. Some or all of the modules can be selected according to actual needs to achieve purposes of this embodiment.

In addition, respective functional units in respective embodiments of the present disclosure may be integrated into one processing unit, or respective units may physically separately exist, or two or more units may be integrated into one unit. The above integrated unit can be implemented in a form of hardware or in a form of a software functional unit.

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment or a part of code containing one or more executable instructions for implementing specified logical functions. It should also be noted that in some alternative implementations, the functions noted in the blocks may also occur in a different order from that noted in the drawings. For example, two blocks in succession may actually be executed in substantially parallel, or they may sometimes be executed in a reverse order, depending on the functions involved. It should also be noted that each block in the block diagrams and/or flowcharts, along with combinations of blocks in the block diagrams and/or flowcharts, can be implemented with dedicated hardware-based systems that perform specified functions or operations, or can be implemented with combinations of dedicated hardware and computer instructions.

What is claimed is:

1. A method for filtering an ill corpus, comprising:
    S1: acquiring, by at least one processor, a text corpus to be recognized, and preprocessing the text corpus to be recognized to obtain a basic text corpus by at least one processor;
    S2: extracting, by at least one processor, entities in the basic text corpus, and performing matching search on the entities of the basic text corpus according to an ill-text knowledge graph to obtain a first recognition result;
    S3: detecting and recognizing, by at least one processor, the basic text corpus according to a corpus recognition model to obtain a second recognition result; and
    S4: filtering, by at least one processor, the text corpus to be recognized according to at least one of the first recognition result and the second recognition result, and
    S5: updating the ill-text knowledge graph according to the second recognition result, so as to update ill information in a form of new words into the ill-text knowledge graph in real time;
    wherein a construction of the ill-text knowledge graph comprises:
        acquiring a large amount of original ill text information in a network platform, and extracting entities of the original ill text information to obtain a plurality of ill word entities;
        performing entity conversion processing on the ill word entities so as to obtain ill word pinyin entities and ill word homophonic entities; and
        extracting a relationship among the ill word entities, the ill word pinyin entities and the ill word homophonic entities according to pinyin conversion, homophonic conversion and part-of-speech and term frequency, and constructing triples by entity disambiguating so as to obtain the ill-text knowledge graph;
    wherein obtaining the first recognition result specifically comprises:
        screening the entities of the basic text corpus according to the ill-text knowledge graph so as to obtain a plurality of candidate ill entities by a preset number; and
        mapping the basic text corpus and the candidate ill entities into a multidimensional vector using a word2vec model, calculating similarity between the basic text corpus and the candidate ill entities according to a cosine-similarity calculation method, and obtaining the first recognition result according to the similarity;
    wherein the corpus recognition model is a k-nearest neighbor model;
    wherein a construction of the corpus recognition model comprises:
        acquiring the ill information fed back by users and collecting normal corpus information;
        performing pinyin conversion and homophonic conversion on the ill information and the normal corpus information word by word to obtain pinyin corpus information and homophonic corpus information;
        dividing the ill information, the normal corpus information, phonetic corpus information and the homophonic corpus information as a sample set into a training set and a test set, and mapping the sample set into a spatial vector through the word2vec model; and
        performing training on the training set mapped into the spatial vector using a k-nearest neighbor model so as to obtain the corpus recognition model;
    wherein the second recognition result is configured as a supplement to the first recognition result, and the model is constructed to filter out hidden ill information in the form of new words;
    wherein there is no sequential relationship between steps S2 and S3.

2. The method for filtering the ill corpus according to claim 1, wherein performing entity conversion processing on the ill word entities so as to obtain the ill word pinyin entities and the ill word homophonic entities comprises:

performing pinyin conversion on the ill word entities, and perform pinyin conversion on Chinese characters of the ill word entities word by word to obtain the ill word pinyin entities; and performing homophonic conversion on the ill word entities and performing homophonic conversion on the Chinese characters of the ill word entities word by word to obtain the ill word homophonic entities.

3. The method for filtering the ill corpus according to claim 1, wherein the text corpus to be recognized comprises barrage comments and message comments.

4. The method for filtering the ill corpus according to claim 1, wherein the preprocessing comprises participle processing, stop word processing and function word processing.

5. A non-transitory computer readable medium having stored thereon instructions to cause a computer to execute a method for filtering an ill corpus comprising:

S1: acquiring, by at least one processor, a text corpus to be recognized, and preprocessing the text corpus to be recognized to obtain a basic text corpus by at least one processor;

S2: extracting, by at least one processor, entities in the basic text corpus, and performing matching search on the entities of the basic text corpus according to an ill-text knowledge graph to obtain a first recognition result;

S3: detecting and recognizing, by at least one processor, the basic text corpus according to a corpus recognition model to obtain a second recognition result; and S4: filtering, by at least one processor, the text corpus to be recognized according to at least one of the first recognition result and the second recognition result, and S5: updating the ill-text knowledge graph according to the second recognition result, so as to update ill information in a form of new words into the ill-text knowledge graph in real time;

wherein a construction of the ill-text knowledge graph comprises:

acquiring a large amount of original ill text information in a network platform, and extracting entities of the original ill text information to obtain a plurality of ill word entities;

performing entity conversion processing on the ill word entities so as to obtain ill word pinyin entities and ill word homophonic entities; and extracting a relationship among the ill word entities, the ill word pinyin entities and the ill word homophonic entities according to pinyin conversion, homophonic conversion and part-of-speech and term frequency, and constructing triples by entity disambiguating so as to obtain the ill-text knowledge graph;

wherein obtaining the first recognition result specifically comprises:

screening the entities of the basic text corpus according to the ill-text knowledge graph so as to obtain a plurality of candidate ill entities by a preset number; and mapping the basic text corpus and the candidate ill entities into a multidimensional vector using a word2vec model, calculating similarity between the basic text corpus and the candidate ill entities according to a cosine-similarity calculation method, and obtaining the first recognition result according to the similarity;

wherein the corpus recognition model is a k-nearest neighbor model;

wherein a construction of the corpus recognition model comprises:

acquiring the ill information fed back by users and collecting normal corpus information;

performing pinyin conversion and homophonic conversion on the ill information and the normal corpus information word by word to obtain pinyin corpus information and homophonic corpus information;

dividing the ill information, the normal corpus information, phonetic corpus information and the homophonic corpus information as a sample set into a training set and a test set, and mapping the sample set into a spatial vector through the word2vec model; and performing training on the training set mapped into the spatial vector using a k-nearest neighbor model so as to obtain the corpus recognition model;

wherein the second recognition result is configured as a supplement to the first recognition result, and the model is constructed to filter out hidden ill information in the form of new words;

wherein there is no sequential relationship between steps S2 and S3.

6. The non-transitory computer readable medium for filtering the ill corpus according to claim 5, wherein performing entity conversion processing on the ill word entities so as to obtain the ill word pinyin entities and the ill word homophonic entities comprises:

performing pinyin conversion on the ill word entities, and perform pinyin conversion on Chinese characters of the ill word entities word by word to obtain the ill word pinyin entities; and performing homophonic conversion on the ill word entities and performing homophonic conversion on the Chinese characters of the ill word entities word by word to obtain the ill word homophonic entities.

7. The non-transitory computer readable medium for filtering the ill corpus according to claim 5, wherein the text corpus to be recognized comprises barrage comments and message comments.

8. The non-transitory computer readable medium for filtering the ill corpus according to claim 5, wherein the preprocessing comprises participle processing, stop word processing and function word processing.

9. A system for filtering an ill corpus according, comprising:

at least one processor; and a non-transitory computer readable medium having stored thereon instructions to cause the at least one processor to execute a method comprising:

S1: acquiring, by the at least one processor, a text corpus to be recognized, and preprocessing the text corpus to be recognized to obtain a basic text corpus by at least one processor;

S2: extracting, by at least one processor, entities in the basic text corpus, and performing matching search on the entities of the basic text corpus according to an ill-text knowledge graph to obtain a first recognition result;

S3: detecting and recognizing, by at least one processor, the basic text corpus according to a corpus recognition model to obtain a second recognition result; and S4: filtering, by at least one processor, the text corpus to be recognized according to at least one of the first recognition result and the second recognition result, and S5: updating the ill-text knowledge graph according to the second recognition result, so as to update ill information in a form of new words into the ill-text knowledge graph in real time;

wherein a construction of the ill-text knowledge graph comprises:

acquiring a large amount of original ill text information in a network platform, and extracting entities of the original ill text information to obtain a plurality of ill word entities;

performing entity conversion processing on the ill word entities so as to obtain ill word pinyin entities and ill word homophonic entities; and extracting a relationship among the ill word entities, the ill word pinyin entities and the ill word homophonic entities according to pinyin conversion, homophonic conversion and part-of-speech and term frequency, and constructing triples by entity disambiguating so as to obtain the ill-text knowledge graph;

wherein obtaining the first recognition result specifically comprises:

screening the entities of the basic text corpus according to the ill-text knowledge graph so as to obtain a plurality of candidate ill entities by a preset number; and mapping the basic text corpus and the candidate ill entities into a multidimensional vector using a word2vec model, calculating similarity between the basic text corpus and the candidate ill entities according to a cosine-similarity calculation method, and obtaining the first recognition result according to the similarity;

wherein the corpus recognition model is a k-nearest neighbor model;

wherein a construction of the corpus recognition model comprises:

acquiring the ill information fed back by users and collecting normal corpus information;

performing pinyin conversion and homophonic conversion on the ill information and the normal corpus information word by word to obtain pinyin corpus information and homophonic corpus information;

dividing the ill information, the normal corpus information, phonetic corpus information and the homophonic corpus information as a sample set into a training set and a test set, and mapping the sample set into a spatial vector through the word2vec model; and performing training on the training set mapped into the spatial vector using a k-nearest neighbor model so as to obtain the corpus recognition model;

wherein the second recognition result is configured as a supplement to the first recognition result, and the model is constructed to filter out hidden ill information in the form of new words;

wherein there is no sequential relationship between steps S2 and S3.

10. The system for filtering the ill corpus according to claim 9, wherein performing entity conversion processing on the ill word entities so as to obtain the ill word pinyin entities and the ill word homophonic entities comprises:

performing pinyin conversion on the ill word entities, and perform pinyin conversion on Chinese characters of the ill word entities word by word to obtain the ill word pinyin entities; and performing homophonic conversion on the ill word entities and performing homophonic conversion on the Chinese characters of the ill word entities word by word to obtain the ill word homophonic entities.

11. The system for filtering the ill corpus according to claim 9, wherein the text corpus to be recognized comprises barrage comments and message comments.

12. The system for filtering the ill corpus according to claim 9, wherein the preprocessing comprises participle processing, stop word processing and function word processing.

* * * * *